(12) United States Patent
Lee et al.

(10) Patent No.: US 12,548,492 B2
(45) Date of Patent: Feb. 10, 2026

(54) DVFS CONTROL METHOD AND ELECTRIC DEVICE USING THE SAME

(71) Applicant: Samsung Electronics Co., Ltd., Suwon-si (KR)

(72) Inventors: Chang-Ju Lee, Suwon-si (KR); Yul-Gon Kim, Suwon-si (KR); Hoonmo Yang, Suwon-si (KR); Sanghoon Lee, Suwon-si (KR); Beobki Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/885,938

(22) Filed: Sep. 16, 2024

(65) Prior Publication Data

US 2025/0279033 A1   Sep. 4, 2025

(30) Foreign Application Priority Data

Feb. 29, 2024   (KR) .................. 10-2024-0030181

(51) Int. Cl.
  *G06F 1/32* (2019.01)
  *G09G 3/20* (2006.01)

(52) U.S. Cl.
  CPC ....... *G09G 3/2096* (2013.01); *G09G 2300/02* (2013.01); *G09G 2330/021* (2013.01); *G09G 2340/0435* (2013.01)

(58) Field of Classification Search
  CPC ............. G09G 3/2096; G09G 2300/02; G09G 2330/021; G09G 2340/0435
  See application file for complete search history.

(56) References Cited

U.S. PATENT DOCUMENTS

| | | | |
|---|---|---|---|
| 7,868,479 B2 | 1/2011 | Subramaniam | |
| 8,775,839 B2 | 7/2014 | Cousson et al. | |
| 9,378,536 B2 | 6/2016 | Park et al. | |
| 10,818,270 B2 | 10/2020 | Bae et al. | |
| 10,977,988 B2 | 4/2021 | Lee et al. | |
| 11,301,029 B2 | 4/2022 | Zhang et al. | |
| 11,361,734 B2 | 6/2022 | Bae et al. | |
| 2009/0001814 A1 | 1/2009 | Subramaniam | |
| 2009/0204831 A1 | 8/2009 | Cousson et al. | |
| 2014/0184619 A1 | 7/2014 | Kim | |
| 2014/0301259 A1* | 10/2014 | Homchaudhuri | H04W 52/029 370/311 |

(Continued)

FOREIGN PATENT DOCUMENTS

KR    102519727 B1   4/2023

*Primary Examiner* — Sanghyuk Park
(74) *Attorney, Agent, or Firm* — Fish & Richardson P.C.

(57) ABSTRACT

An electronic device may include a host CPU providing a frame data and a frame update instruction; a display driving IC (DDI) configured to drive the display panel; a display processor configured to determine a frame transmission period for transmitting the frame data to the DDI in response to the frame update instruction, and to generate a DVFS (Dynamic Voltage and Frequency Scaling) setup/release signal according to the determined frame transmission period; and a power management unit configured to manage a power and clock signals to provide a band width required for the frame data transmission according to the DVFS setup/release signal.

20 Claims, 10 Drawing Sheets

(56) References Cited

U.S. PATENT DOCUMENTS

| | | | |
|---|---|---|---|
| 2014/0324245 A1* | 10/2014 | Kwon | .................. G06F 1/206 |
| | | | 700/299 |
| 2015/0317762 A1 | 11/2015 | Park et al. | |
| 2018/0040301 A1 | 2/2018 | Bae et al. | |
| 2020/0234635 A1 | 7/2020 | Lee et al. | |
| 2021/0041937 A1 | 2/2021 | Zhang et al. | |
| 2021/0043169 A1 | 2/2021 | Bae et al. | |

\* cited by examiner

DVFS CONTROL METHOD AND ELECTRIC DEVICE USING THE SAME

CROSS-REFERENCE TO RELATED APPLICATION

This application claims priority to and the benefit of Korean Patent Application No. 10-2024-0030181 filed in the Korean Intellectual Property Office on Feb. 29, 2024, the entire contents of which are incorporated herein by reference.

BACKGROUND

Technical Field

The present disclosure relates to a DVFS (Dynamic Voltage and Frequency Scaling) control method and an electronic device using the same.

Description of the Related Art

A general-purpose operating system (OS) such as Android handles for a display driver a hibernation of a display processor and a dynamic voltage and frequency scaling (DVFS) for shared resources. For example, when a frame update instruction instructing a frame data transmission to the display processor is not provided from an application, an OS, or a driving software for several frames (tens of msec), the OS and the driving software turn off the display processor and release values requested to a bus or a memory interface that provides a data communication with the display processor.

In this way, the hibernation or the DVFS processing is performed when there are no frame update instructions for several frames, so unnecessary power consumption does not occur during the corresponding several frames. Recently, over-the-top (OTT) video with a higher user usage rate, such as Youtube or Netflix, is mainly serviced at a frame rate of 24 Hz or 30 Hz, in the case of a 120 Hz update panel, the shared resources must maintain higher voltage and/or clock speed even in frames in which the frame data is not updated, in addition to frames in which the actual frame data is updated. This may cause unnecessary electric power to be consumed, thereby increasing the entire power consumption of the electronic device.

SUMMARY

The present disclosure is to provide electronic devices and DVFS control methods that may reduce a power consumption of electronic devices including displays.

An electronic device according to one feature of the disclosure may include a host CPU configured to provide a frame data and a frame update instruction; a display driving IC (DDI) configured to drive the display panel; a display processor configured to determine a frame transmission period for transmitting the frame data to the DDI in response to the frame update instruction, and to generate a DVFS (Dynamic Voltage and Frequency Scaling) setup/release signal according to the determined frame transmission period; and a power management unit configured to manage a power and clock signals to provide a band width required for the frame data transmission according to the DVFS setup/release signal.

An electronic device according to another feature of the disclosure may include at least two display panels; at least a first display driving IC (DDI) and a second DDI configured to drive the at least two display panels; a host CPU configured to provide a first frame data and a second frame data for the first DDI and the second DDI, and a first frame update instruction and a second frame update instruction; a display processor configured to determine a first frame transmission period for transmitting the first frame data to the first DDI in response to the first frame update instruction, to generate a first dynamic voltage and frequency scaling (DVFS) setup/release signal as the first frame data transmission is determined, to determine a second frame transmission period to transmit the second frame data to the second DDI in response to the second frame update instruction, and to generate a second DVFS setup/release signal as the second frame data transmission is determined; and a power management unit configured to manage a power and clock signals to provide a band width required for a transmission of the first frame data and the second frame data according to the first DVFS setup/release signal and the second DVFS setup/release signal.

A dynamic voltage and frequency scaling (DVFS) control method by a display processor configured to transmit a frame data to a display driving IC (DDI) of driving a display panel according to another feature of the disclosure may include receiving a frame update instruction from a host CPU; determining whether a first time point at which the frame update instruction is received is earlier than a second time point earlier by as much as a first frame update allowance period with a first frame transmission period as a reference; generating a DVFS setup/release signal to indicate a DVFS setup state and transmitting a frame data to the DDI within the first frame transmission period based on the first time preceding the second time; and managing a power and clock signals to provide a band width required for the frame data transmission according to the DVFS setup/release signal.

When there is no frame data transmission from the display processor to the DDI, a system power consumption may be (greatly) reduced by more quickly releasing the band width.

DETAILED DESCRIPTION OF EXAMPLE EMBODIMENTS

A display processor according to some example embodiments may generate a DVFS control interrupt for a DVFS control depending on whether a frame data is transmitted to a display driving IC.

Figure 1:
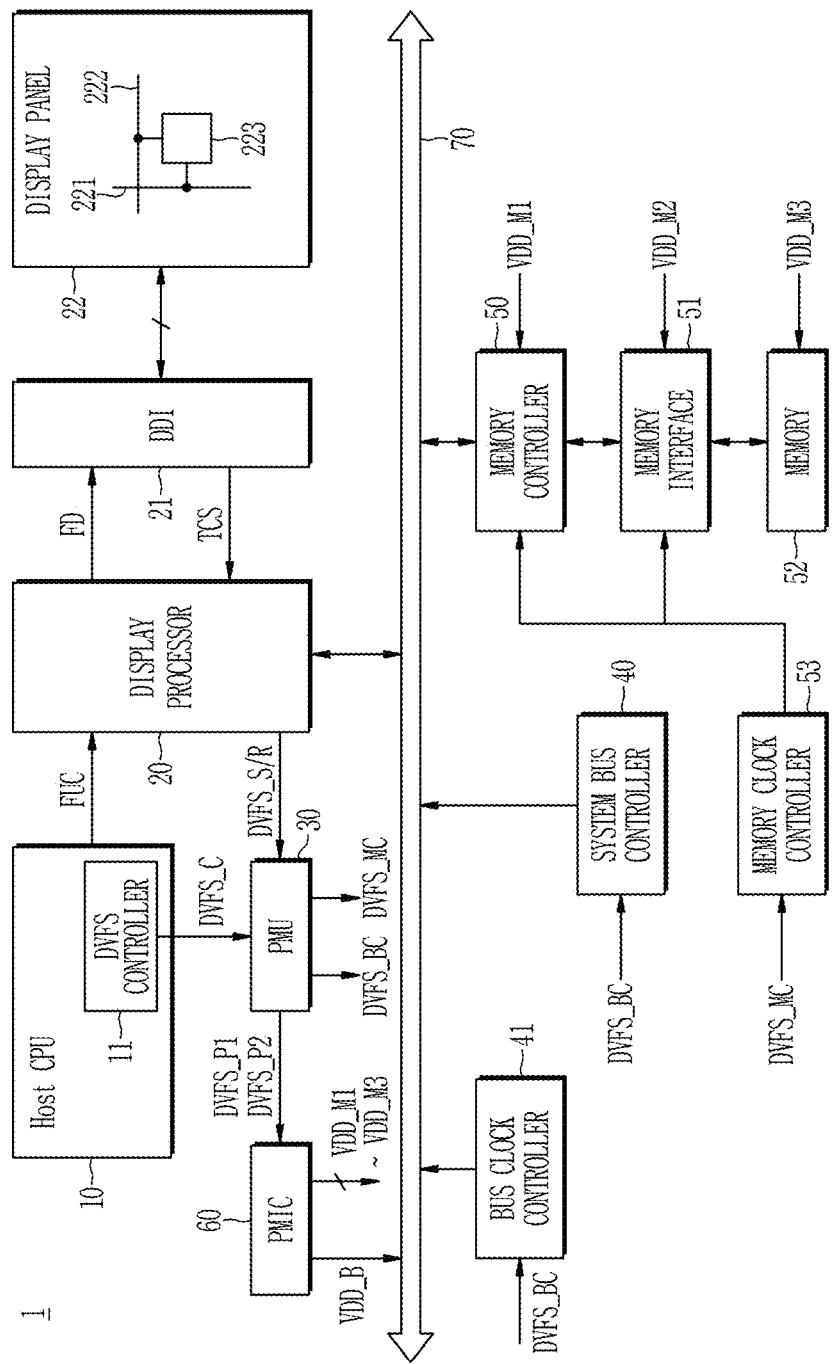
FIG. 1 is a block diagram showing an electronic device according to some example embodiments.

FIG. 1 is a block diagram showing an electronic device according to some example embodiments.

As shown in FIG. 1, an electronic device 1 may include a host CPU (Central Processing Unit) 10, a display processor 20, a display driving IC (DDI) 21, a display panel 22, a power management unit (PMU) 30, a system bus controller 40, a bus clock controller 41, a memory controller 50, a memory interface 51, a memory 52, an electric power module IC (PMIC) 60, and/or a system bus 70. A data transmission/reception between at least two of the host CPU 10, the display processor 20, and the memory controller 50 may be performed through the system bus 70. A data transmission/reception between the components in the electronic device 1 may be performed directly through other wires and/or channels in addition to the system bus 70.

The electronic device 1 may include at least one of various electronic devices including a display such as a smartphone, a tablet personal computer, a mobile phone, an image phone, an e-book reader, a desktop PC (personal computer), a laptop PC (a laptop personal computer), a netbook computer, a workstation, a server, mobile medical devices, smart spectacles, a head mounted device (HMD), a smart watch, etc.

The host CPU 10 is a core circuit of the electronic device 1 that is equipped with an operating system (OS) and runs a plurality of application software to control the overall operation of electronic device 1. The host CPU 10 may generate a frame data or receive the frame data. The host CPU 10 may directly transmit the frame data to the processor 20 or store it in the memory 52. The host CPU 10 may provide a frame update instruction to the processor 20 to output the frame data from the processor 20 to the DDI 21. In FIG. 1, the DVFS controller 11 is shown as being provided in the host CPU 10, but the disclosure is not limited thereto. In some example embodiments of the present disclosure, the DVFS controller 11 may be provided in the power management unit 30 for a hibernation control of the frame unit.

The DVFS controller 11 may determine the operating status of function blocks that perform functions according to the control by the host CPU 10, and generate a DVFS control signal DVFS_C according to the determining result to be provided to the power management unit 30. Additionally, a DVFS setup/release (hereinafter, DVFS_S/R) signal DVFS_S/R depending on whether the display processor 20 operates a frame data transmission may be provided by the display processor 20. The higher level of the DVFS setup/release signal DVFS_S/R according to some example embodiments may indicate the DVFS setup state, and the lower level may indicate the DVFS release state. Hereinafter, the DVFS setup/release signal is referred to as the DVFS S/R signal. In the DVFS setup state, the power management unit 30 generates the DVFS signals to increase the band width, and in the DVFS release state, the power management unit 30 may generate the DVFS signals so that there is no band width change for the transmission of the frame data. In FIG. 1, one DVFS S/R signal DVFS_S/R is shown, but the signal indicating the DVFS setup state and the signal indicating the DVFS release state may be separated. In the following description, the higher level of the DVFS S/R signal DVFS_S/R may be interpreted as a signal indicating the DVFS setup, and the lower level of the DVFS S/R signal DVFS_S/R may be interpreted as a signal indicating the DVFS release.

The display processor 20 may receive a frame update instruction from the host CPU 10 and transmit the frame data to the DDI 21 in response to the frame update instruction. The display processor 20 may store the frame data provided from the host CPU 10 in the memory 52. The display processor 20 may output the frame data read from the memory 52 to the DDI 21 through the memory controller 50. The display processor 20 may process the frame data as a video signal to be output to the DDI 21. In addition to the display processor 20, the image processing IPs that make up a system on chip (SoC) of the electronic device 1 may perform the video signal processing. The video signal processing may mean that the DDI 21 converts the frame data to the video signal that matches the characteristics of the display panel 22. The display processor 20 may generate the DVFS S/R signal DVFS_S/R depending on whether the frame data is transmitted to DDI 21 and transmit the DVFS S/R signal DVFS_S/R to the power management unit 30.

The power management unit 30 is an intellectual property (IP) for managing the power and the operating frequency of the resources of the electronic device 1. The power management unit 30 according to some example embodiments may generate a plurality of DVFS signals DVFS_P1, DVFS_P2, DVFS_BC, and DVFS_MC according to the DVFS control signal DVFS_C and the DVFS S/R signal DVFS_S/R. The power management unit 30 may generate two DVFS signals DVFS_P1 and DVFS_P2 to control the PMIC 60 and provide two DVFS signals DVFS_P1 and DVFS_P2 to the PMIC 60. The power management unit 30 may generate a DVFS signal DVFS_BC to control the bus clock signal supplied to the system bus 70 and provide the DVFS signal DVFS_BC to the bus clock controller 41. The power management unit 30 may generate a DVFS signal DVFS_MC to control the memory clock signal that controls the operation of the memory controller 50 and the memory interface 51 and provide the DVFS signal DVFS_MC to the memory clock controller 53. For the display processor 20 to the transmit frame data to the DDI 21, an increase in the band width is required. To provide the required increase in the band width, the power management unit 30 may manage a power, a bus clock signal, and a memory clock signal by generating the plurality of DVFS signals DVFS_P1, DVFS_P2, DVFS_BC, and DVFS_MC according to the DVFS S/R signal DVFS_S/R received from the display processor 20.

The PMIC 60 may generate a bus power voltage VDD_B according to DVFS signal DVFS_P1 to be supplied to the system bus controller 40. The PMIC 60 may generate a plurality of memory power voltages VDD_M1, VDD_M2, and VDD_M3 according to the DVFS signal DVFS_P2 to be supplied to the memory controller 50, the memory interface 51, and the memory 52, respectively.

When the DVFS change occurs for the memory interface 51 and the system bus 70, the system bus controller 40 changes the settings for controlling system bus 70 according to the changed DVFS and manage a data/instruction traffic generated by main IPs of the application processor of the host CPU 10 according to the DVFS signal DVFS_BC.

The bus clock controller 41 may control the bus clock signal that controls the signal transmitting/receiving through the system bus 70. The data, address, and instruction transmitting/receiving may be performed through the system bus 70 according to the bus clock signal. The bus clock controller 41 may control the frequency of the bus clock signal according to the DVFS signal DVFS_BC. The bus clock controller 41 may be implemented as a phase-locked loop (PLL).

The memory clock controller 53 may control the memory clock signal that controls the operation of the memory controller 50 and the memory interface 51. The memory clock controller 53 may control the frequency of the memory clock signal according to the DVFS signal DVFS_MC. The memory clock controller 53 may be implemented as a phase-locked loop (PLL).

For example, the bus clock controller 41 may set up a PLL that generates a bus clock signal according to the DVFS signal DVFS_BC, the memory clock controller 53 may set up a PLL that generates a memory clock signal according to the DVFS signal DVFS_MC, and the power voltages of the system bus 70, the system bus controller 40, the memory controller 50, and the memory interface 51 may be changed. The system bus controller 40 may adjust the settings of the system bus 70 for the stable operation of the system bus 70 and the memory interface 51 according to the frequency and power voltage of the changed clock signals.

The memory controller 50 may control the operation of the memory 52 through the memory interface 51. The memory controller 50 controls the program operation of the memory 52 so that the memory 52 stores the data received through system bus 70, and may transmit the data read from the memory 52 to the system bus 70. The memory interface 51 may perform the transmitting/receiving of instructions, addresses, and data between the memory controller 50 and the memory 52. The memory controller 50 and the memory interface 51 may operate based on the memory clock signal. In FIG. 1, the memory interface 51 is shown as a separate configuration, but the memory interface 51 may be implemented by being integrated into one of the memory controller 50 or the memory 52.

The DDI 21 may generate a plurality of video signals for the plurality of pixels according to the frame data provided from the display processor 20, and provide a plurality of video signals of frame units to the display panel 22 according to a vertical synchronization and a horizontal synchronization. The DDI 21 may generate a vertical synchronization signal and a horizontal synchronizing signal according to the predetermined or alternatively, desired frame frequency and the resolution of the display panel 22, and provide the plurality of video signals to each of a plurality of pixel rows of the display panel 22 according to the horizontal synchronizing signal every frame defined by the vertical synchronization signal.

The display panel 22 may display images according to the plurality of video signals provided by the DDI 21. The display panel 22 may be implemented by a thin film transistor liquid crystal display (TFT-LCD) panel, a light emitting diode (LED) display panel, an organic LED (OLED) display panel, an active matrix OLED (AMOLED) display panel, or a flexible display panel, the like. The display panel 22 may be implemented as a low temperature poly crystalline oxide (LTPO) panel.

The display panel 22 may include a plurality of data lines 221, a plurality of gate lines 222, and/or a plurality of pixels 223. Each pixel 223 may be connected to the corresponding data line 221 among the plurality of data lines and the corresponding gate line 222 among the plurality of gate lines. Each pixel 223 may store the video signal provided through the data line 221 during an on-level period of the gate signal provided through the gate line 222, and emit light according to the stored video signal.

For the frame data transmission from the display processor 20 to the DDI 21, the band width required for the bus 70 and the memory interface 51 increases. If there is no the frame data transmission from the display processor 20 to the DDI 21, the band width required for the bus 70 and the memory interface 51 does not increase. The display processor 20 may define a frame transmission period for the frame data transmission to the DDI 21. The display processor 20 may define a periodic frame transmission period based on a frame rate followed by the DDI 21. Every frame transmission period, the display processor 20 may or may not transmit the frame data according to the frame update instruction. The display processor 20 may determine whether to transmit the frame data in each frame transmission period and generate the DVFS S/R signal DVFS_S/R according to the decision. For example, when transmitting the frame data to a certain frame transmission period, the display processor 20 may generate the DVFS S/R signal DVFS_S/R to increase the band width or maintain the increased band width. Alternatively, when the frame data is not transmitted to a certain frame transmission period, the display processor 20 may generate a DVFS S/R signal DVFS_S/R that does not change the band width (instructing the DVFS release). If the band width is increased for the frame data transmission in the previous frame transmission period, the band width may appear to decrease depending on the DVFS S/R signal DVFS_S/R, which indicates the DVFS release.

Figure 2:
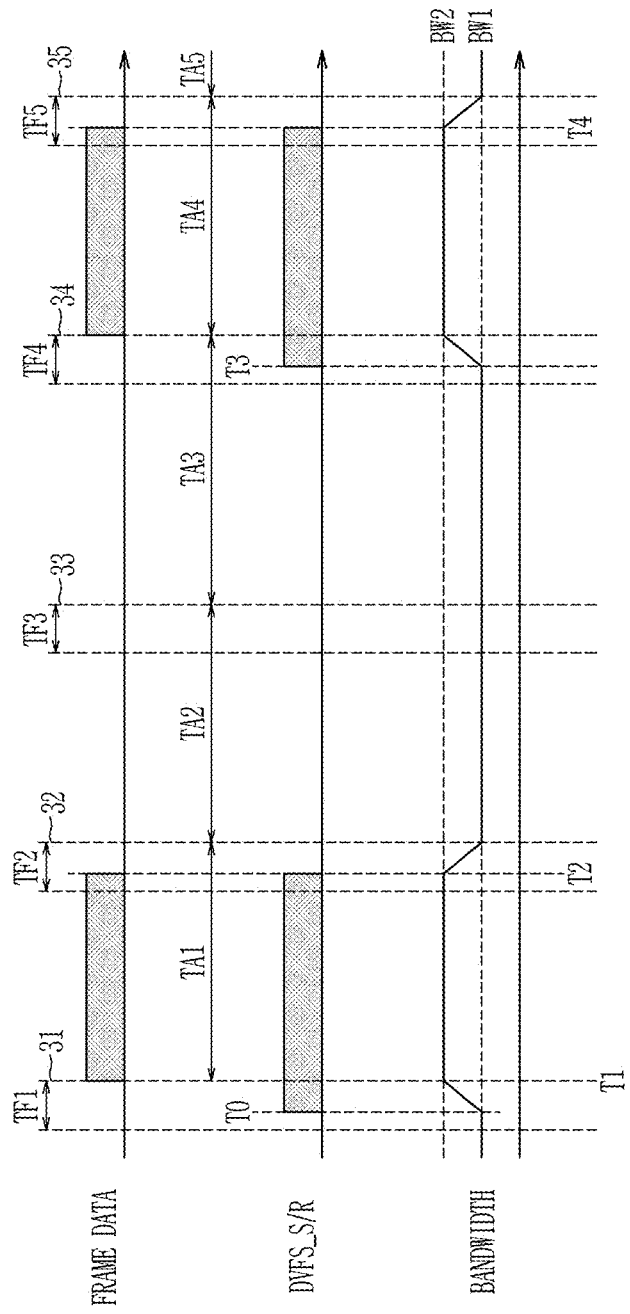
FIG. 2 is a waveform diagram schematically showing a DVFS S/R signal according to some example embodiments.

FIG. 2 is a waveform diagram schematically showing a DVFS S/R signal according to some example embodiments.

In FIG. 2, a horizontal axis direction means a passage of time, and a plurality of dotted lines 31-35 extending in a vertical direction are positioned at regular intervals along the horizontal direction. Among the plurality of longitudinal dotted lines 31-35, each of time intervals TA1 to TA4 between two adjacent longitudinal dotted lines includes a frame transmission period. The time points indicated by the plurality of longitudinal dotted lines 31-35 may be synchronized with the vertical synchronization of the DDI 21 or the vertical synchronization/N (N is a natural number of 2 or more). Hereinafter, the time point indicated by each of the plurality of longitudinal dotted lines 31 to 35 is referred to as a transmission synchronization time point. The display processor 20 may set the frame transmission period according to the transmission synchronization time point. For example, the display processor 20 may set the period between two adjacent transmission synchronization time points as a frame transmission period.

The display processor 20 may transmit the frame data to the DDI 21 in the frame transmission period TA1. Before a predetermined or alternatively, desired period (TF) based on a starting point (T1, the transmission synchronization time point) of the frame transmission period TA1, the display processor 20 may determine whether to transmit the frame data in frame transmission period TA1. For the frame transmission in the frame transmission period TA1, the display processor 20 may generate the DVFS S/R signal DVFS_S/R at higher level at a time point TO. The power management unit 30 transmits DVFS signals DVFS_P1, DVFS_P2, DVFS_BC, and DVFS_MC to increase the band width according to the DVFS S/R signal DVFS_S/R of higher level. Then, as schematically shown in FIG. 2, the band width of the system bus 70 and the memory interface 51 increases from "BW1" to "BW2" during a period T0 to T1. The band width "BW1" schematically represents the band width required for the operation of other resources of the electronic device 1 other than the display processor 20. "BW2" schematically represents a band width of adding a band width required for the display processor 20 to transmit the frame data to the band width "BW1". Each of the plurality of periods TF1 to TF5 is a period in which whether to transmit the frame data in each of the next frame transmission periods TA1 to TA5 is determined, and is referred to as "a frame update allowance period."

Within the frame update allowance period, the band width may be increased to the level required for the frame transmission. The display processor 20 may determine that there is no frame data transmission of the frame transmission period TA2 in the frame update allowance period TF2, and generate the DVFS S/R signal DVFS_S/R with lower level after a time point T2 when the previous frame data transmission is completed. The power management unit 30 transmits the DVFS signals DVFS_P1, DVFS_P2, DVFS_BC, and DVFS_MC that do not increase the band width according to the DVFS S/R signal DVFS_S/R of lower level. Then, as schematically shown in FIG. 2, the band width of the system bus 70 and the memory interface 51 decreases from "BW2" to "BW1".

The display processor 20 may determine that there is no frame data transmission of the frame transmission period TA3 in the frame update allowance period TF3, and maintain the DVFS S/R signal DVFS_S/R with lower level. The display processor 20 may decide to transmit the frame data to the DDI 21 for the frame transmission period TA4 in the frame update allowance period TF4. The display processor 20 may generate the DVFS S/R signal DVFS_S/R with higher level at a time point T3. The power management unit 30 transmits the DVFS signals DVFS_P1, DVFS_P2, DVFS_BC, and DVFS_MC to increase the band width according to the DVFS S/R signal DVFS_S/R of higher level. Then, as schematically shown in FIG. 2, the band width of the system bus 70 and the memory interface 51 increases from "BW1" to "BW2".

The display processor 20 may determine that there is no frame data transmission of the frame transmission period TA5 in the frame update allowance period TF5. The display processor 20 may generate the DVFS S/R signal DVFS_S/R with lower level after a time point T4 when the previous frame data transmission is completed. The power management unit 30 transmits the DVFS signals DVFS_P1, DVFS_P2, DVFS_BC, and DVFS_MC that do not increase the band width according to the DVFS S/R signal DVFS_S/R of lower level. Then, as schematically shown in FIG. 2, the band width of the system bus 70 and the memory interface 51 decreases from "BW2" to "BW1".

Figure 3:
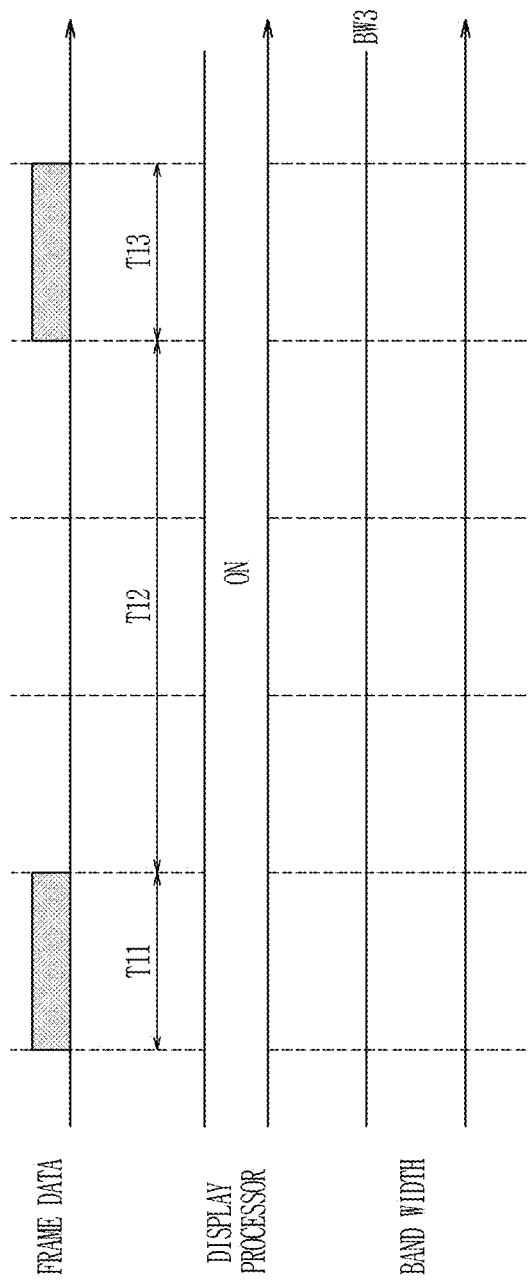
FIG. 3 is a waveform diagram showing a DVFS control signal and a band width depending on a conventional frame data transmission.

FIG. 3 is a waveform diagram showing a DVFS control signal and a band width according to a conventional technique whether to transmit the frame data.

As shown in FIG. 3, there is a frame data transmission only in a period T11 and a period T13, and even if there is no a frame data transmission during a period T12, the display processor is in an "ON" state and the band width is maintained at "BW3".

In general, the host CPU of the system may perform a software (a display software) that controls the operation of the display processor. There may be a difference between the display instruction time provided by the display software and the display operation time of the display processor. To reduce or prevent a display erroneous operation due to this, the host CPU changes the state of the resources of the system to a lower electric power state at a time when the system may be operated stably enough. The host CPU serves not only the system software such as the OS of the systems, but also related resources necessary to perform various applications with a best effort strategy, so may be difficult to synchronize a specific time when the display processor operates (VSYNC, etc.) and the operating time of the display software. The display processor may frequently provide the operation time as an interrupt to the display software, and a method in which the display software processes the interrupt, may also be considered. However, the display processor frequently occupies the operation of the host CPU, and the utilization of the entire resource for the host CPU is reduced. Ultimately, the system performance may be greatly deteriorated, and a system power consumption may increase in order to process the same workload within a limited time. Additionally, a display reactivity may decrease due to the control by a feedback loop between the host CPU and the display processor, as an amount of an execution code that performs the feedback loop operations increases, the power consumption of the host CPU may increase.

Even in conventional art, if there is no transmission of the frame data for a period longer than the period T12 shown in FIG. 3, the DVFS control is performed and the increased band width may decrease. However, for the stable operation of the resources that make up the electronic device, whether or not the frame data is transmitted cannot be reflected in the DVFS control in real-time. For the same reasons as above, as shown in FIG. 3, even if there is no frame data transmission during the period T12, the band width is maintained at "BW3".

In the electronic device 1 according to some example embodiments, the display processor 20 may generate an interrupt for DVFS control, for example, the DVFS S/R signal, depending on whether the display processor 20 transmits frame data, so that whether or not the frame is transmitted is reflected in real time in the DVFS control.

Figure 4:
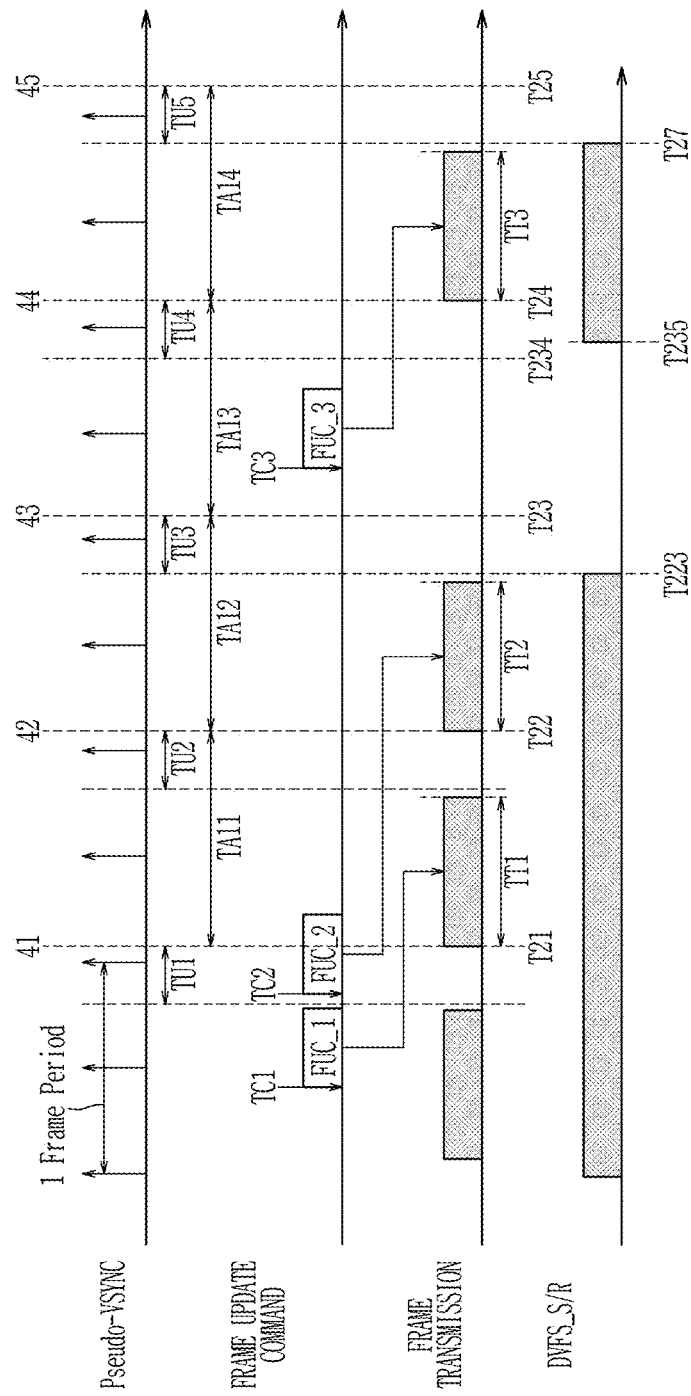
FIG. 4 is a waveform diagram to explain a method for determining whether to transmit a frame according to a frame update instruction according to some example embodiments.

FIG. 4 is a waveform diagram to explain a method for determining whether to transmit a frame according to a frame update instruction according to some example embodiments.

In FIG. 4, the horizontal axis direction may mean the passage of a time. A pseudo-vertical synchronization (Pseudo-VSYNC) shown in FIG. 4 may be defined as points in time to be synchronized to a vertical synchronization or a vertical synchronization/N (N is a natural number of 2 or more). In FIG. 4, a plurality of quasi-vertical synchronizations synchronized in the vertical synchronization/2 are shown. Among the plurality of quasi-vertical synchronizations, twice the time interval between two adjacent quasi-vertical synchronizations may be one frame period (1 Frame period) defined by the DDI 21.

In FIG. 4, a plurality of dotted lines 41 to 45 extending in the vertical direction are positioned with a regular interval along the horizontal direction. Among the plurality of longitudinal dotted lines 41-45, each of the time intervals TA11 to TA14 between two adjacent longitudinal dotted lines may be a frame transmission period. Each of the plurality of time points T21 to T25 indicated by each of the plurality of longitudinal dotted lines 41-45 is referred to as a transmission synchronization time point as a starting point of the plurality of frame transmission periods TA11 to TA14. The plurality of transmission synchronization time points T21 to T25 may be synchronized with a predetermined or alternatively, desired phase difference in 2-cycles units for the plurality of quasi-vertical synchronizations.

As shown in FIG. 4, the display processor 20 may predefine a time schedule for the plurality of transmission synchronization time points T21 to T25 and the plurality of frame transmission periods TA11 to TA14, and determine whether to transmit the frame data in each of the plurality of frame transmission periods according to the time schedule defined while counting the time, based on the frame update instruction FUC. For example, when the time difference between a time point when the display processor 20 receives a frame update command and each of the plurality of transmission synchronization time points T21 through T25 is longer than or equal to a corresponding one of the plurality of predetermined or alternatively, desired frame update allowance periods TU1 to TU5, the display processor 20 may transmit the frame data indicated by the frame update instruction to the DDI 21 within the frame transmission period of the corresponding transmission synchronization time point.

The display processor 20 may generate the DVFS S/R signal DVFS_S/R of higher level that sets the DVFS control when transmitting the frame data to the DDI 21, and generate the DVFS S/R signal DVFS_S/R of low level that releases the DVFS control when there is no frame data to transmit.

Figure 5:
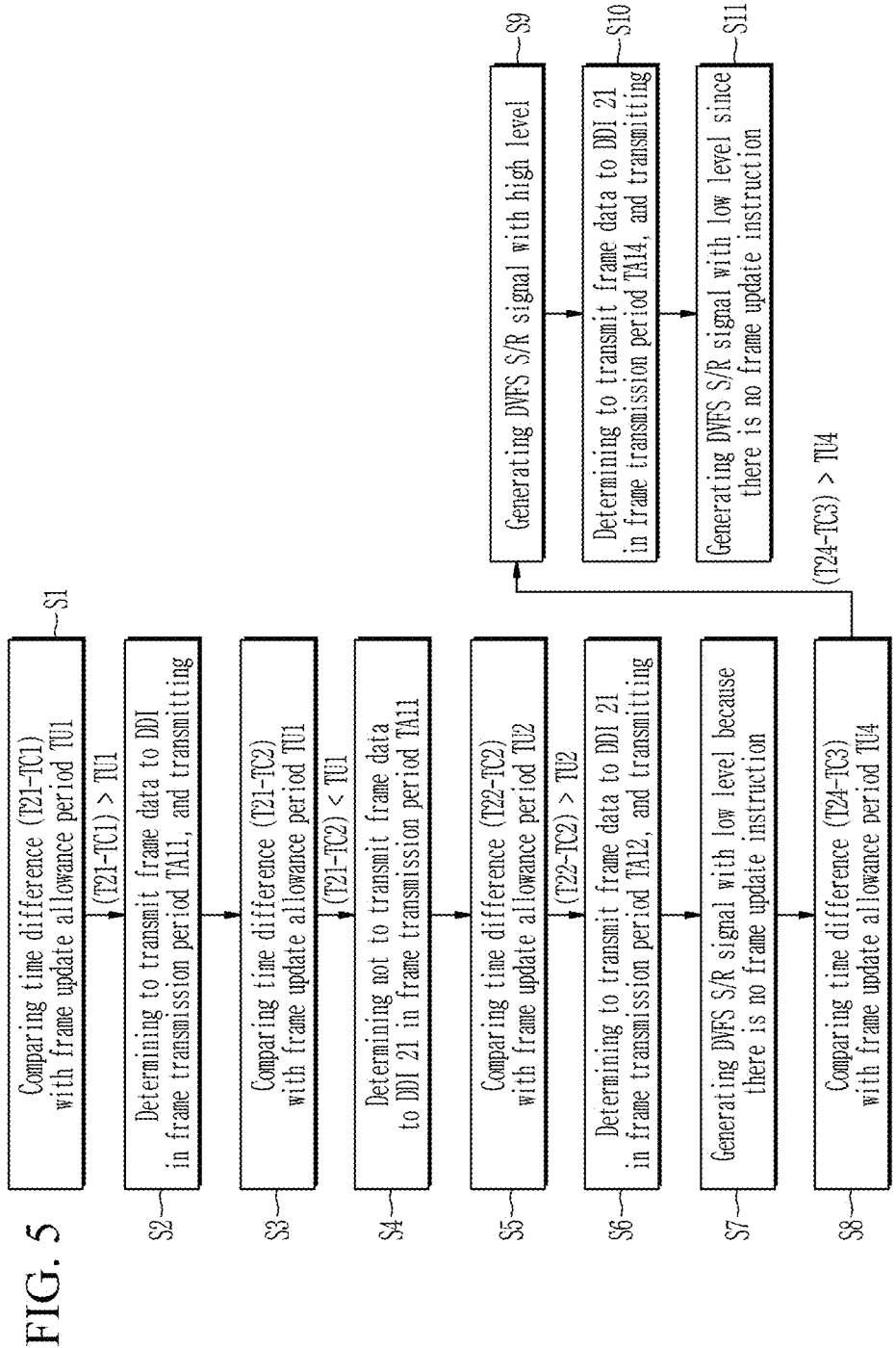
FIG. 5 is a flowchart showing a method for determining whether to transmit a frame according to some example embodiments.

FIG. 5 is a flowchart showing a method for determining whether to transmit a frame according to some example embodiments.

The display processor 20 may compare a time difference (T21-TC1) between a time point TC1 at which a frame update instruction FUC_1 is received and a transmission synchronization time point T21 after the time point TC1 with a frame update allowance period TU1 (S1).

As a comparison result of the operation (S1), the time difference T21 to TC1 is longer than the frame update allowance period TU1. The display processor 20 determines to transmit the frame data corresponding to the frame update instruction FUC_1 to the DDI 21 in the frame transmission period TA11, and may transmit during the period TT1 (S2). The period TT1 may be a period within the frame transmission period TA11.

The display processor 20 may compare a time difference (T21-TC2) between a time point TC2 at which a frame update instruction FUC_2 is received and a transmission synchronization time point T21 after the time point TC2 with the frame update allowance period TU1 (S3).

As the comparison result of the operation (S3), the time difference T21 to TC2 is shorter than the frame update allowance period TU1. The display processor 20 may determine not to transmit the frame data corresponding to the frame update instruction FUC_2 to the DDI 21 in the frame transmission period TA11 (S4).

Subsequently, the display processor 20 may compare a time difference (T22-TC2) between a time point TC2 and the transmission synchronization time point T22 next of the transmission synchronization time point T21 with the frame update allowance period TU2 (S5).

As the comparison result of the operation (S4), the time difference (T22-TC2) is longer than the frame update allowance period TU2. The display processor 20 determines to transmit the frame data corresponding to the frame update instruction FUC_2 to the DDI 21 in the frame transmission period TA12, and may transmit it during the period TT2 (S6). The period TT2 may be a period within the frame transmission period TA12.

The display processor 20 generates the DVFS S/R signal DVFS_S/R with low level at a time point T223 because there is no frame update instruction until the time point T223 before the frame update allowance period TU3 with reference to the transmission synchronization time point T23 (S7).

Subsequently, the display processor 20 may compare a time difference (T24-TC3) between a time point TC3 at which a frame update instruction FUC_3 is received and a transmission synchronization time point T24 after the time point TC3 with a frame update allowance period TU4 (S8).

As the comparison result of the operation (S8, the time difference (T24-TC3) is longer than the frame update allowance period TU4. The display processor 20 may generate the DVFS S/R signal DVFS_S/R at higher level at the time point T235 within the frame update allowance period TU4 (S9). The display processor 20 determines to transmit the frame data corresponding to the frame update instruction FUC_3 to the DDI 21 in the frame transmission period TA14, and may transmit it during the period TT3 (S10). The period TT3 may be a period within the frame transmission period TA14.

Since there is no frame update instruction until the time point T27 before the frame update allowance period TU5 with reference to the transmission synchronization time point T25, the display processor 20 may generate the DVFS S/R signal DVFS_S/R at low level at the time point T27 (S11).

When determining whether to transmit the frame data to the DDI 21, the display processor 20 may consider the operating state of the DDI 21. The DDI 21 may generate a control signal that blocks the frame data transmission of the display processor 20 and transmit it to the display processor 20.

When the DDI 21 is updating the panel with a data stored in a GRAM (Graphic RAM), if the display processor 20 writes a new frame data to the GRAM, the period during which the DDI 21 reads the GRAM data and the period in which the display processor 20 writes the data to the GRAM may overlap. If two periods overlap, a tearing of the display screen may occur. To reduce or prevent this, when updating the panel with the GRAM data, the DDI 21 may transmit a transmission control signal (TCS) that blocks the frame data transmission to the display processor 20 independently, regardless of the frame data transmission from the display processor 20 to the display processor 20. For example, when the DDI 21 drives the display panel 22 using the frame data stored by the DDI 21, the DDI 21 must block the transmission of the frame data from the display processor 20. After the DDI 21 completes a panel update with the GRAM data, it may generate a transmission control signal that allows the frame data transmission of the display processor 20.

Figure 6:
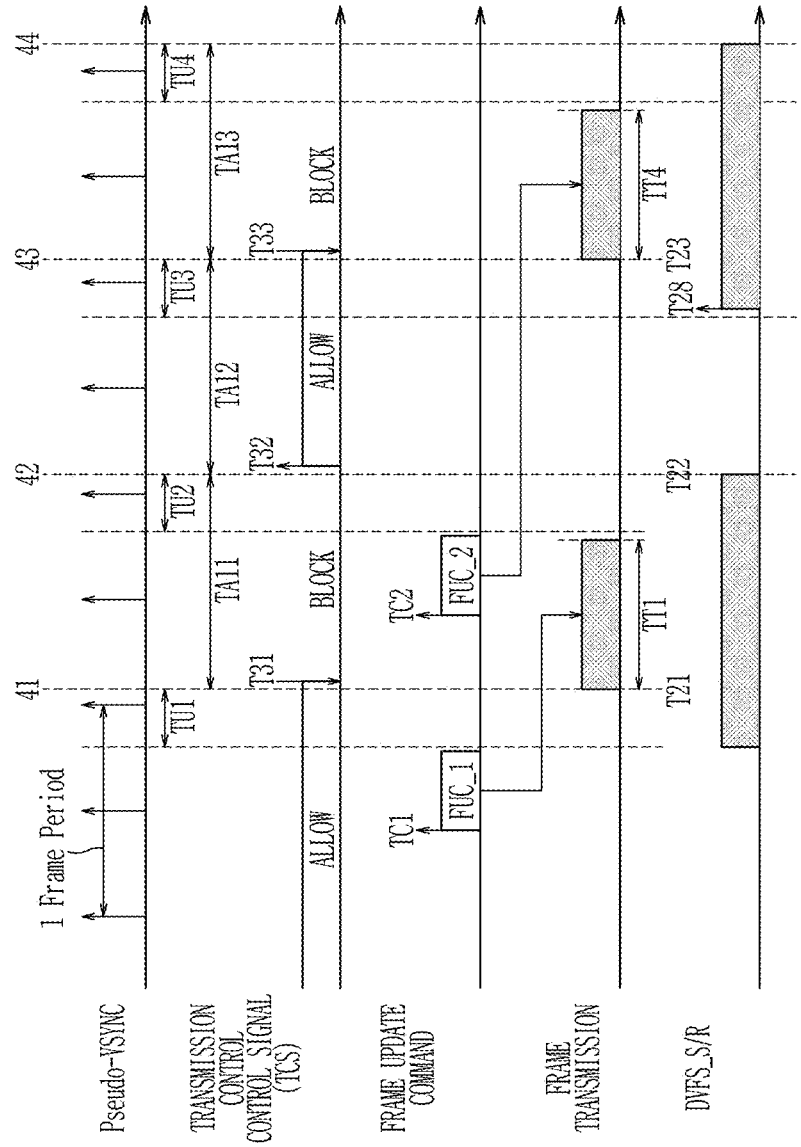
FIG. 6 is a waveform diagram to explain a method for determining whether to transmit a frame according to a transmission control signal according to some example embodiments.

FIG. 6 is a waveform diagram to explain a method for determining whether to transmit a frame according to a transmission control signal according to some example embodiments.

For example embodiments shown in FIG. 6, descriptions that are the same as those of example embodiments shown in FIG. 4 are omitted. Referring to FIG. 6, the frame data transmission method when the frame update instruction occurs during a period in which the frame data transmission is blocked is described. As shown in FIG. 6, a transmission control signal TCS may be transmitted from the DDI 21 to the display processor 20. As shown in FIG. 6, the DDI 21 may generate a higher level transmission control signal TCS when instructing a transmission allowance (ALLOW), and generate a low level transmission control signal TCS when instructing a transmission block (BLOCK). This is an example, however, the phase of the transmission control signal TCS may be opposite.

In the frame update allowance period TU1, the transmission control signal TCS is a higher level indicating the transmission allowance, and the display processor 20 may determine to transmit the frame data corresponding to the frame update instruction FUC_1 received at the time point TC1 to the DDI 21 in the frame transmission period TA11. At the time point T31 after the frame transmission start, the DDI 21 may generate the transmission control signal TCS of low level that indicates blocking the frame data transmission. The DDI 21 may maintain the transmission control signal TCS at a low level while updating the transmitted frame data on the panel. The DDI 21 may complete the frame data update at the time point T32 and generate the transmission control signal TCS at a higher level indicating the transmission allowance.

The display processor 20 may receive the frame update instruction FUC2 at the time point TC2 before the frame update allowance period TU2. In the frame update allowance period TU2, the display processor 20 may determine whether to transmit the frame data corresponding to the frame update instruction FUC2 to the DDI 21. As shown in FIG. 6, Since the transmission control signal TCS is a low level indicating the transmission blocking in the frame update allowance period TU2, the display processor 20 may determine not to transmit the frame data in the frame transmission period TA12. Since the display processor 20 does not perform the frame data transmission in the frame transmission period TA12, the DVFS S/R signal DVFS_S/R may be generated with low level at the time point T22.

At the time point T32, the DDI 21 may generate the transmission control signal TCS of higher level indicating the transmission allowance. Then, since the transmission control signal TCS in the frame update allowance period TU3 is higher level indicating transmission allowance, the display processor 20 may determine to transmit the frame data corresponding to the frame update instruction FUC_2 to the DDI 21 in the frame transmission period TA13. The display processor 20 may generate the DVFS S/R signal DVFS_S/R with higher level at the time point T28. The display processor 20 may transmit the frame data to the DDI 21 during the period TT4 within the frame transmission period TA13.

Figure 7:
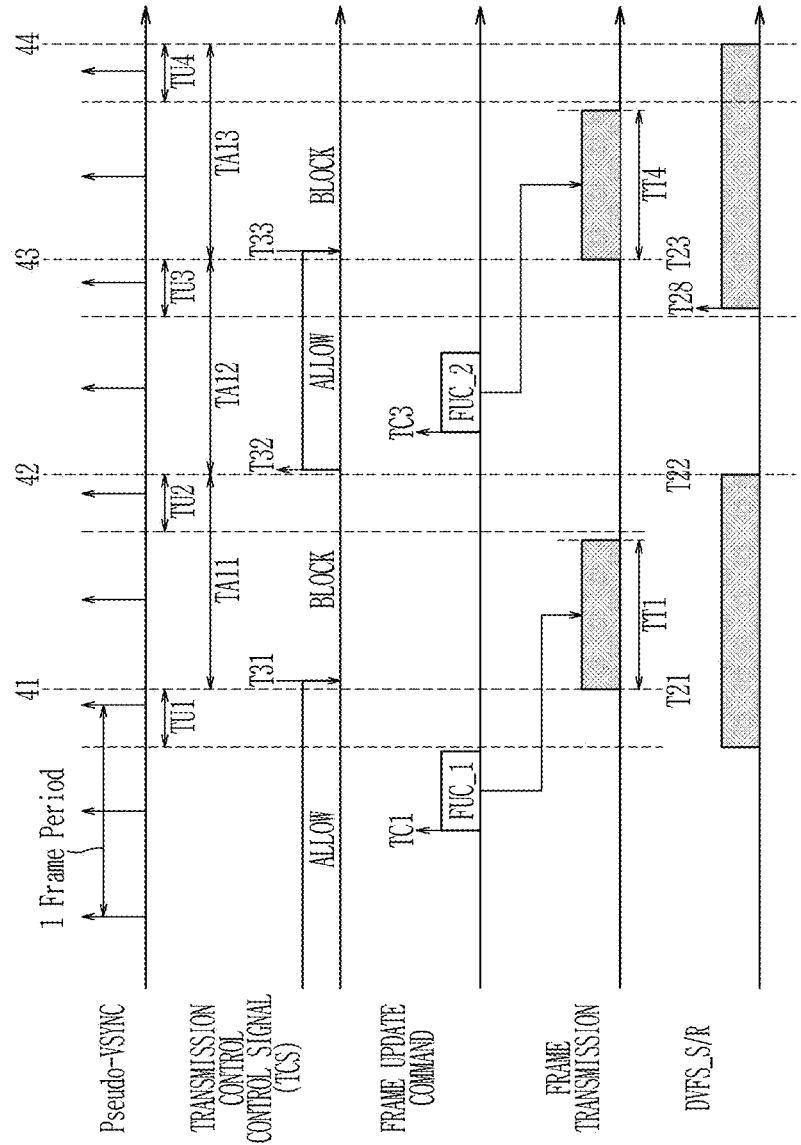
FIG. 7 is a waveform diagram to explain a method for determining whether to transmit a frame according to a transmission control signal according to some example embodiments.

At the time point T33 after the frame transmission start, the DDI 21 may generate the transmission control signal TCS of low level that indicates the frame data transmission blocking. The DDI 21 may maintain the transmission control signal TCS at low level while updating the transmitted frame data on the panel. FIG. 7 is a waveform diagram to explain a method for determining whether to transmit a frame according to a transmission control signal according to some example embodiments.

For example embodiments shown in FIG. 7, the descriptions that are the same as those of example embodiments shown in FIG. 6 are omitted.

Since there is no frame update instruction received before the frame update allowance period TU2, the display processor 20 may generate the DVFS S/R signal DVFS_S/R with low level at the time point T22.

At the time point T32, the DDI 21 may generate the transmission control signal TCS of higher level indicating the transmittance allowance. The display processor 20 may receive the frame update instruction FUC2 at the time point TC3 before the frame update allowance period TU3. In the frame update allowance period TU3, the display processor 20 may determine whether to transmit the frame data corresponding to frame update instruction FUC2 to the DDI 21. As shown in FIG. 7, since the transmission control signal TCS is a higher level indicating the transmission allowance in the frame update allowance period TU3, the display processor 20 may determine to transmit the frame data corresponding to the frame update instruction FUC_2 to the DDI 21 in the frame transmission period TA13. The display processor 20 may generate the DVFS S/R signal DVFS_S/R with higher level at the time point T28. The display processor 20 may transmit the frame data to the DDI 21 during the period TT4 within the frame transmission period TA13.

In previous example embodiments, the electronic device includes one display panel, but the disclosure was not limited thereto. The electronic device may include two or more display panels.

Figure 8:
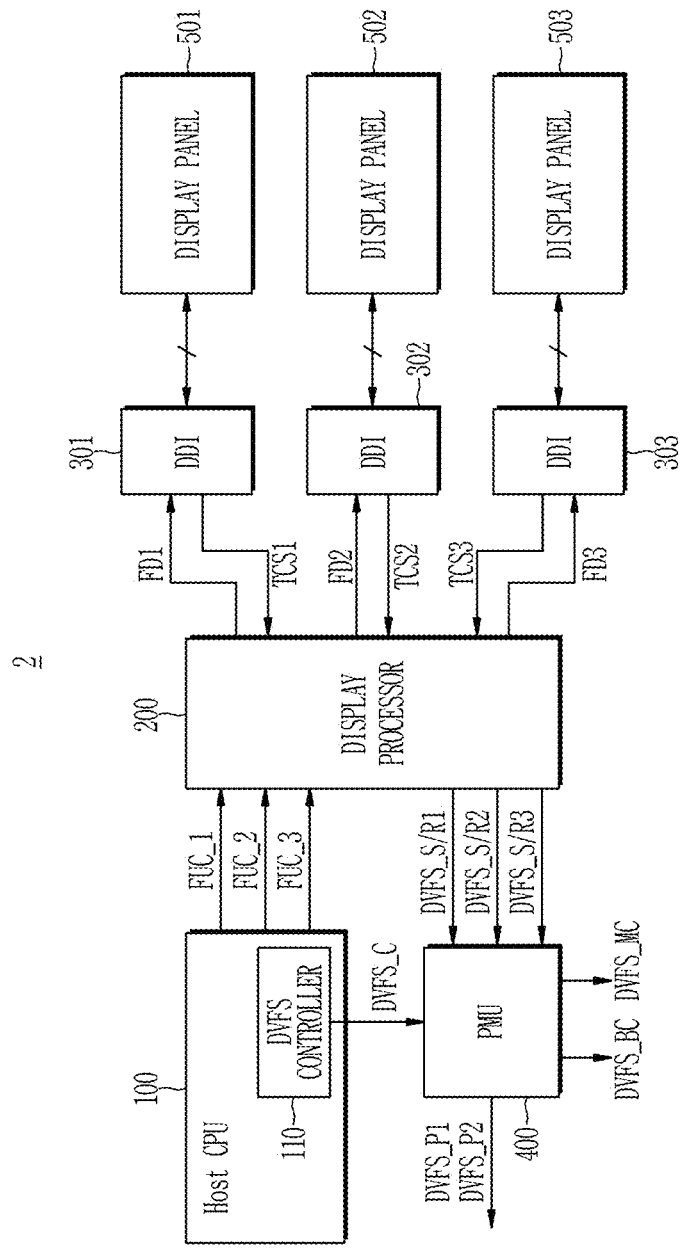
FIG. 8 is a block diagram showing an electronic device according to some example embodiments.

FIG. 8 is a block diagram showing an electronic device according to some example embodiments.

As shown in FIG. 8, an electronic device 2 may include a host CPU 100, a display processor 200, a plurality of DDIs 301, 302, and 303, a power management unit 400, and/or a plurality of display panels 501, 502, and 503. The electronic device 2 may include components included in the electronic device 1 according to example embodiments shown in FIG. 1.

As shown in FIG. 8, when the electronic device 2 include a plurality of display panels 501, 502, and 503, a plurality of DDIs 301, 302, and 303 that drive the plurality of display panels 501, 502, and 503, respectively, may be provided. Unlike shown in FIG. 8, the plurality of DDIs 301, 302, and 303 may be integrated and implemented as one DDI.

The host CPU 100 may generate a plurality of frame update instructions FUC1, FUC2, and FUC3 for each of the plurality of display panels 501, 502, and 503 to be transmitted to the display processor 200. The host CPU 100 may include a DVFS controller 110. The DVFS controller 110 may determine the operating status of function blocks that perform functions according to a control by the host CPU 10, and generate a DVFS control signal DVFS_C according to the determination result to be provided to the power management unit 400.

The display processor 200 may receive the plurality of frame update instructions FUC1, FUC2, and FUC3 from the host CPU 100, and perform a video signal processing for each of the plurality of frame data FD1, FD2, and FD3 in response to the plurality of frame update instructions FUC1, FUC2, and FUC3, respectively to be transmitted to the plurality of DDI 301, 302, and 303, respectively. The display processor 200 may generate a plurality of DVFS S/R signals DVFS_S/R1, DVFS_S/R2, and DVFS_S/R3 according to whether to transmit the frame data to each of the plurality of DDIs 301, 302, and 303 to be transmitted to the power management unit 400.

Each of the plurality of DDI 301, 302, and 303 may generate a plurality of video signals according to the plurality of frame data FD1, FD2, and FD3 provided from the display processor 200, respectively, and provide the plurality of video signals of a frame unit to each of the plurality of display panels 501, 502, and 503 according to a vertical synchronization and a horizontal synchronization for each of the plurality of display panels 501, 502, and 503. Each of the plurality of DDIs 301, 302, and 303 may generate a vertical synchronization signal and a horizontal synchronizing signal according to a predetermined or alternatively, desired frame frequency and each resolution of the plurality of display panels 501, 502, and 503, and provide the plurality of video signals to each of a plurality of pixel rows of each of the plurality of display panels 501, 502, and 503 according to the horizontal synchronizing signal every frame defined by the vertical synchronization signal.

Each of the plurality of display panels 501, 502, and 503 may display an image according to the plurality of video signals provided from each of the plurality of DDIs 301, 302, and 303. Each of the plurality of display panels 501, 502, and 503 may be implemented by a thin film transistor liquid crystal display (TFT-LCD) panel, a light emitting diode (LED) display panel, an organic LED (OLED) display panel, an active matrix OLED (AMOLED) display panel, or a flexible display panel. Each of the plurality of display panels 501, 502, and 503 may be implemented as a low temperature poly crystalline oxide (LTPO) panel.

The power management unit 400 is an intellectual property (IP) for managing the power and operating frequency of the resources of the electronic device 2. The power management unit 400 according to some example embodiments may generate a plurality of DVFS signals DVFS_P1, DVFS_P2, DVFS_BC, and DVFS_MC according to the DVFS control signal DVFS_C and the plurality of DVFS S/R signals DVFS_S/R1, DVFS_S/R2, and DVFS_S/R3. The power management unit 400 may generate two DVFS signals DVFS_P1 and DVFS_P2 to control the PMIC (60, referring to FIG. 1) to be provided to the PMIC 60. The power management unit 400 may generate the DVFS signal DVFS_BC to control the bus clock signal supplied to the system bus (70, referring to FIG. 1) to be provided to the bus clock controller (41, referring to FIG. 1). The power management unit 400 may generate the DVFS signal DVFS_MC to control the memory clock signal that controls the operation of the memory controller (50, referring to FIG. 1) and the memory interface (51, referring to FIG. 1) to control the memory clock controller (53, referring to FIG. 1).

Figure 9:
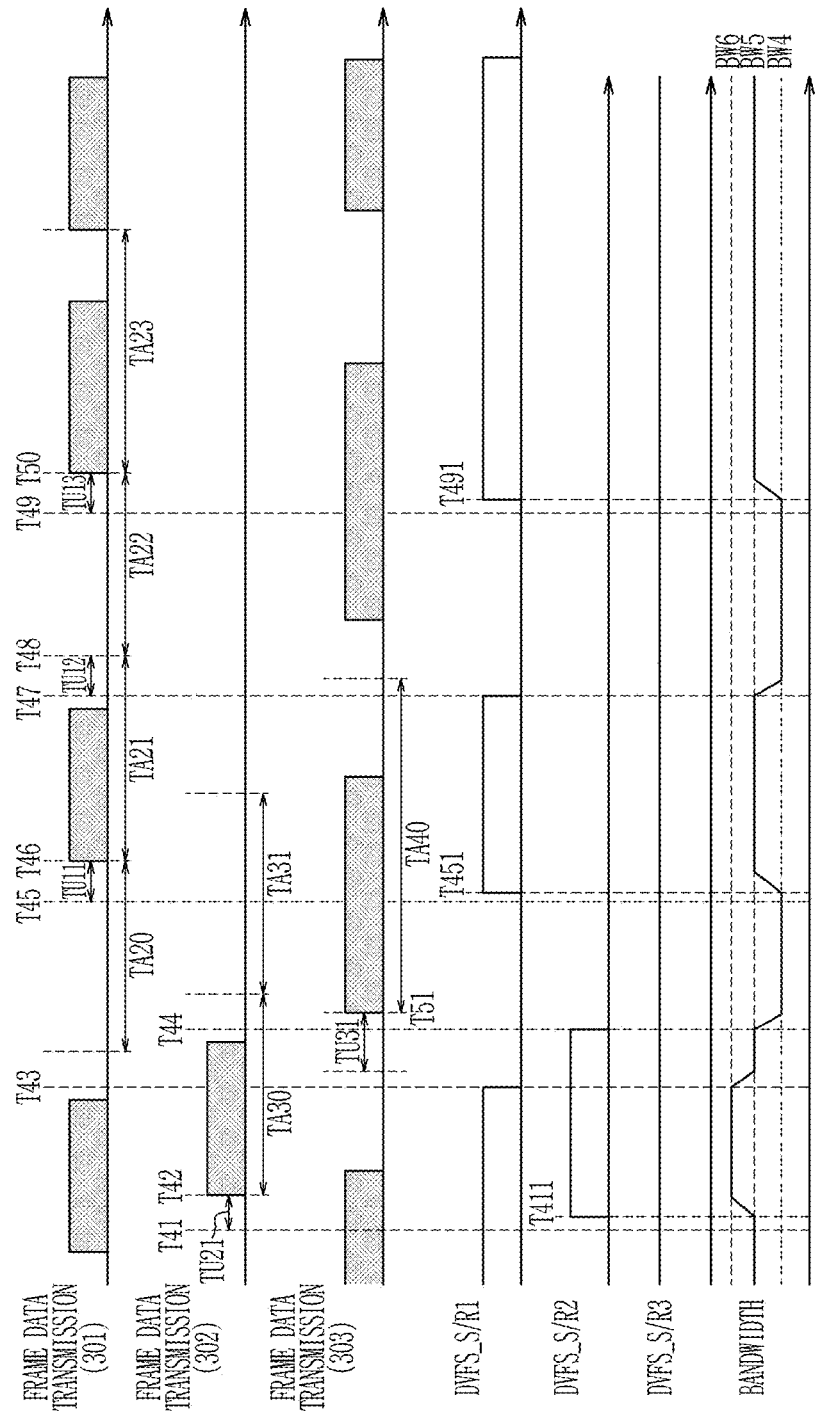
FIG. 9 is a waveform diagram showing a plurality of DVFS control signals and a band width depending on whether or not a frame data is transmitted to a plurality of DDIs according to some example embodiments.

FIG. 9 is a waveform diagram showing a plurality of DVFS control signals and a band width depending on whether to transmit a frame data to a plurality of DDIs according to some example embodiments.

In the waveform diagram shown in FIG. 9, the period during which the display processor 200 transmits the frame data to each of the plurality of DDI 301, 302, and 303 is shown as a block.

The display processor 200 may predefine a time schedule for a plurality of transmission synchronization time points and a plurality of frame transmission periods for each of the plurality of DDIs 301, 302, and 303, and determine whether to transmit the frame data in each of the plurality of frame transmission periods according to the time schedule defined while counting the time based on the plurality of frame update instructions FUC_1, FUC_2, and FUC_3, respectively. For example, for each of the plurality of transmission synchronization time points defined for each of the plurality of DDIs 301 to 303, the time difference between the points when the frame update instructions FUC_1, FUC_2, and FUC_3 are received is longer than or equal to a predetermined or alternatively, desired frame update allowance period, the display processor 200 may transmit the frame data indicated by the corresponding frame update instruction to each of the plurality of DDIs 301, 302, and 303 within the corresponding frame transmission period.

For example, the display processor 200 may determine that there is no frame data transmission in the frame transmission period TA20 at the time point T43 and generate the DVFS S/R signal DVFS_S/R1 as a low level.

When the time difference between the time point when the display processor 200 receives the frame update instruction FUC_1 and the transmission synchronization time point T46 for the DDI 301 is longer than or equal to the frame update allowance period TU11 (T45-T46), the display processor 200 may transmit the frame data indicated by the corresponding frame update instruction to the DDI 301 within the corresponding frame transmission period TA21. The display processor 200 may generate the DVFS S/R signal DVFS_S/R1 at a higher level in order to transmit the frame data in the frame transmission period TA21 at the time point T451. The display processor 200 may determine that there is no frame data transmission in the frame transmission period TA22 at the time point T47 and generate the DVFS S/R signal DVFS_S/R1 as a lower level. When the time difference between the time point when the display processor 200 receives the frame update instruction and the transmission synchronization time point T50 for the DDI 301 is longer than or equal to the frame update allowance period TU13 (T49-T50), the display processor 200 may transmit the frame data indicated by the frame update instruction to the DDI 21 within the frame transmission period TA23. The display processor 200 may generate the DVFS S/R signal DVFS_S/R1 at a higher level in order to transmit the frame data in the frame transmission period TA23 at the time point T491.

When the time difference between the time point when the display processor 200 receives the frame update instruction FUC_2 and the transmission synchronization time point T42 for the DDI 302 is longer than or equal to the frame update allowance period TU21 (T41-T42), the display processor 200 may transmit the frame data indicated by the corresponding frame update instruction to the DDI 302 within the corresponding frame transmission period TA30. The display processor 200 may generate the DVFS S/R signal DVFS_S/R2 as a higher level in order to transmit the frame data in the frame transmission period TA30 at the time point T411. The display processor 200 may determine that there is no frame data transmission in the frame transmission period TA31 at the time point T44 and generate the DVFS S/R signal DVFS_S/R2 as a lower level.

When the time difference between the time point when the display processor 200 receives the frame update instruction FUC_3 and the transmission synchronization time point T51 for the DDI 303 is longer than or equal to the frame update allowance period TU31, the display processor 200 may transmit the frame data indicated by the corresponding frame update instruction to the DDI 303 within the corresponding frame transmission period TA40. In FIG. 9, the display processor 200 transmits the frame data to the DDI 303 every frame transmission period. Accordingly, the display processor 200 may generate the DVFS S/R signal DVFS_S/R3 at higher level.

Referring to the band width of FIG. 9, the bandwidth BW5 required for the display processor 200 to transmit the frame data to the DDI 301 and the DDI 303 before the time point T411 is provided. During a period T411-T43, the bandwidth BW6 required for the display processor 200 to transmit the frame data to the DDI 301, the DDI 302, and the DDI 303 is provided. During the period T43-T44, the bandwidth BW5 required for the display processor 200 to transmit the frame data to the DDI 302 and the DDI 303 is provided. During the period T44-T451, the bandwidth BW4 required for the display processor 200 to transmit the frame data to the DDI 303 is provided. During the period T451-T47, the bandwidth BW5 required for the display processor 200 to transmit the frame data to the DDI 301 and the DDI 303 is provided. During the period T47-T491, the bandwidth BW4 required for the display processor 200 to transmit the frame data to the DDI 303 is provided. After the time point T491, the bandwidth BW5 required for the display processor 200 to transmit the frame data to the DDI 301 and the DDI 303 is provided. In this way, as the power management unit 300 generates the plurality of DVFS signals DVFS_P1, DVFS_P2, DVFS_BC, and DVFS_MC according to the plurality of DVFS S/R signals DVFS_S/R1, DVFS_S/R2, and DVFS_S/R3, to control the PMIC 60, the bus clock controller 41, and the memory clock controller 53, the band width required to transmit the frame data may be provided to the plurality of DDIs 301, 302, and 303.

As shown in FIG. 9, the plurality of DDI 301, 302, and 303 may each transmit the plurality of transmission control signals TCS1, TCS2, and TCS3 to the display processor 200. Earlier referring to FIG. 6, in the same manner as the described example embodiments, the display processor 200 may adjust the period for transmitting the frame data according to the plurality of transmission control signals TCS1, TCS2, and TCS3, respectively.

Figure 10:
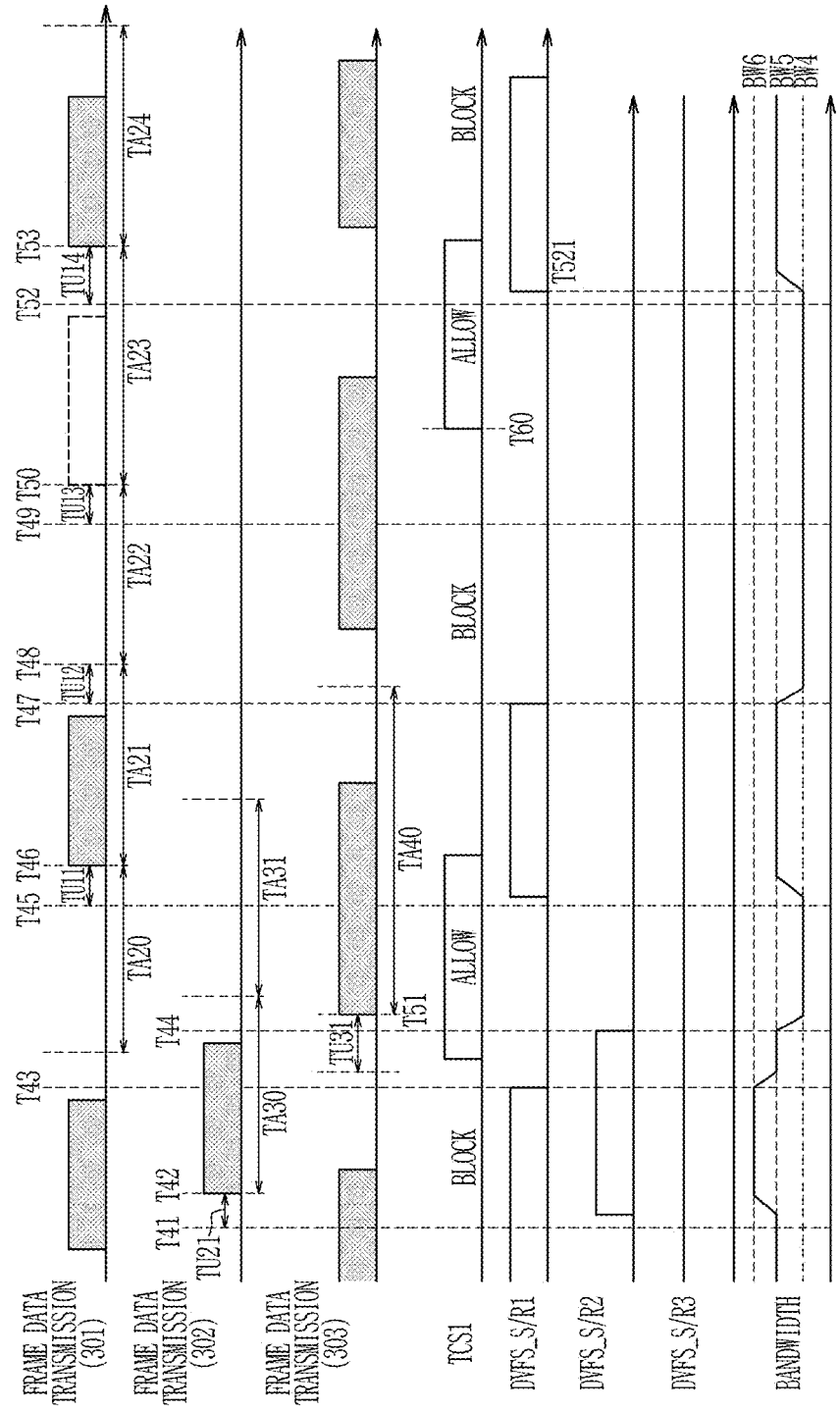
FIG. 10 is a waveform diagram to explain a method for determining whether to transmit a frame according to a transmission control signal in some example embodiments including a plurality of display panels.

FIG. 10 is a waveform diagram to explain a method for determining whether to transmit a frame according to a transmission control signal in some example embodiments including a plurality of display panels.

The parts that are the same as the explanation in FIG. 9 among descriptions for FIG. 10 are omitted. In FIG. 10, among the plurality of transmission control signals TCS1, TCS2, and TCS3, only the transmission control signal TCS1 transmitted from the DDI 301 to the display processor 200 is shown. This is only for better understanding and ease of description and does not limit example embodiments to the present disclosure. The display processor 200 may respond not only to the transmission control signal TCS1 but also to the transmission control signals TCS2 and TCS3 in the same manner as the response to the transmission control signal TCS1.

The time difference between the time point when the display processor 200 receives the frame update instruction and the transmission synchronization time point T50 for DDI 301 is longer than or equal to the frame update allowance period TU13, but before the frame update allowance period TU13, the transmission control signal TCS1 is the lower level indicating the transmission blocking. Then, the display processor 200 may not transmit the frame data to the DDI 301 in the frame transmission period TA23. Since the display processor 200 does not perform the frame data transmission in the frame transmission period TA23, the DVFS S/R signal DVFS_S/R may be maintained at a lower level.

At the time point T60, the DDI 301 may generate the transmission control signal TCS1 of higher level indicating the transmission allowance. Then, since the transmission control signal TCS1 is at a higher level indicating the transmission allowance before the frame update allowance period TU14, the display processor 200 may determine to transmit the frame data to the DDI 301 in the frame transmission period TA24 during the frame update allowance period TU14. The display processor 200 may generate the DVFS S/R signal DVFS_S/R1 at higher level at the time point T521. The display processor 200 may transmit the frame data to the DDI 301 within the frame transmission period TA24. At the time point T521, the band width may increase from "BW4" to "BW5".

The display processor may determine whether to output the frame data more accurately and quickly than other resources that make up the electronic device. Therefore, when the display processor participates in the DVFS control depending on whether to transmit the frame data, the related resources may be controlled in a lower electric power state whenever the frame data transmission does not occur. For example, the electric power status of the resources may be controlled by a frame unit or an equivalent level thereto. For example, when the electronic device including the DDI and the display panel that may update the frame data at 120 fps (frame per second) drives an application or a video scenario at 60 fps or 30 fps, there may be a (significant) power consumption reduction effect by controlling the related resources to enter a lower electric power state during the periods when there is no frame data transmission.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present inventive concepts have been described in detail with reference to the preferred example embodiments, those skilled in the art will appreciate that various modifications and substitutions can be made thereto without departing from the spirit and scope of the present invention as set forth in the appended claims.

What is claimed is:

1. An electronic device comprising:
a host CPU configured to provide a frame data and a frame update instruction;
a display driving IC (DDI) configured to drive a display panel;
a display processor configured to determine a frame transmission period for transmitting the frame data to the DDI in response to the frame update instruction, and to generate a DVFS (Dynamic Voltage and Frequency Scaling) setup/release signal based on the determination of the frame transmission period; and
a power management unit configured to manage a power and clock signals to provide a band width required for the frame data transmission according to the DVFS setup/release signal.

2. The electronic device of claim 1, wherein:
the display processor is configured to generate the DVFS setup/release signal to indicate a DVFS setup state and transmit the frame data within a first frame transmission period, based on a time of receiving the frame update instruction being earlier than a first time, which is earlier by as much as a first frame update allowance period as a reference to the first frame transmission period, and
the power management unit is configured to increase the power and frequencies of the clock signals according to the DVFS setup/release signal.

3. The electronic device of claim 2, wherein:
the display processor is configured to generate the DVFS setup/release signal to indicate the DVFS setup state at a second time of the first frame update allowance period.

4. The electronic device of claim 2, wherein:
the DDI is configured to transmit a transmission control signal that controls allowing and blocking the frame data transmission to the display processor, and the display processor is configured to generate the DVFS setup/release signal to indicate a DVFS release state and does not transmit the frame data to the DDI in the first frame transmission period, based on the transmission control signal before the first frame update allowance period indicating a transmission blocking.

5. The electronic device of claim 1, wherein:
the display processor is configured not to transmit the frame data within a first frame transmission period, and to generate the DVFS setup/release signal to indicate a DVFS release state based on a time of receiving the frame update instruction being a time after a first time, which is earlier by as much as a first frame update allowance period with the first frame transmission period as a reference.

6. The electronic device of claim 5, wherein:
the display processor is configured to generate the DVFS setup/release signal to indicate a DVFS setup state and transmit the frame data within a second frame transmission period, based on a time that the frame update instruction is received being earlier than a second time that is earlier by as much as a second frame update allowance period as a reference to the second frame transmission period after the first frame transmission period, and
the power management unit is configured to increase the power and frequencies of the clock signals according to the DVFS setup/release signal.

7. The electronic device of claim 5, wherein:
the power management unit is configured to not change the power and frequencies of the clock signals according to the DVFS setup/release signal to indicate the DVFS release state, based on there being no frame data transmission in a third frame transmission period immediately before the first frame transmission period.

8. The electronic device of claim 1, further comprising:
a memory controller configured to control operations of memories through a memory interface;
a memory clock controller configured to control a memory clock signal that controls operations of the memory controller and the memory interface;
a bus clock controller configured to control a bus clock signal of a system bus; and
a power module IC (PMIC) configured to supply a power voltage to each of the memory controller, the memory clock controller, and the bus clock controller, and
wherein the clock signals include the bus clock signal and the memory clock signal, and the power management unit is configured to control the memory clock controller, the bus clock controller, and the PMIC according to the DVFS setup/release signal.

9. The electronic device of claim 8, wherein:
the power management unit is configured to generate a DVFS signal for the PMIC according to the DVFS setup/release signal, and
the PMIC is configured to control a first power voltage supplied to the memory controller and the memory clock controller according to the DVFS signal, and to control a second power voltage supplied to the bus clock controller according to the DVFS signal.

10. The electronic device of claim 8, wherein:
the power management unit is configured to generate a DVFS signal for the bus clock controller according to the DVFS setup/release signal, and
the bus clock controller is configured to control the frequency of the bus clock signal according to the DVFS signal.

11. The electronic device of claim 8, wherein:
the power management unit is configured to generate a DVFS signal for the memory clock controller according to the DVFS setup/release signal, and
the memory clock controller is configured to adjust the frequency of the memory clock signal according to the DVFS signal.

12. An electronic device comprising:
at least two display panels;
at least a first display driving IC (DDI) and a second DDI configured to drive the at least two display panels, respectively;
a host CPU configured to provide a first frame data and a second frame data for the first DDI and the second DDI, and a first frame update instruction and a second frame update instruction, respectively;
a display processor configured to determine a first frame transmission period for transmitting the first frame data to the first DDI in response to the first frame update instruction, to generate a first dynamic voltage and frequency scaling (DVFS) setup/release signal as a first frame data transmission is determined, to determine a second frame transmission period to transmit the second frame data to the second DDI in response to the second frame update instruction, and to generate a second DVFS setup/release signal as a second frame data transmission is determined; and
a power management unit configured to manage a power and clock signals to provide a band width required for a transmission of the first frame data and the second frame data according to the first DVFS setup/release signal and the second DVFS setup/release signal.

13. The electronic device of claim 12, wherein:
The display processor is configured to generate the first DVFS setup/release signal to indicate a DVFS setup state and transmit the first frame data within the first frame transmission period, based on a time of receiving the first frame update instruction being earlier than a first time, which is earlier by as much as a first frame update allowance period as a reference to the first frame transmission period,
the display processor is configured to generate the second DVFS setup/release signal to indicate the DVFS setup state and transmit the second frame data within the first frame transmission period, based on a time of receiving the second frame update instruction being earlier than a second time that is earlier by as much as a second frame update allowance period as a reference to the second frame transmission period, and
the power management unit is configured to control frequencies of the power and the clock signals according to the first DVFS setup/release signal and the second DVFS setup/release signal.

14. The electronic device of claim 12, wherein:
the display processor is configured to generate the first DVFS setup/release signal to indicate a DVFS setup state and transmit the first frame data within the first frame transmission period, based on a time of receiving the first frame update instruction being earlier than a first time, which is earlier by as much as a first frame update allowance period as a reference to the first frame transmission period,
the display processor is configured to not transmit the second frame data within the second frame transmission period, and to generate the second DVFS setup/release signal to indicate a DVFS release state, based on a time of receiving the second frame update instruction being a time after a second time, which is earlier by as much as a second frame update allowance period as a reference to the second frame transmission period, and the power management unit is configured to control the power and frequencies of the clock signals according to the first DVFS setup/release signal and the second DVFS setup/release signal.

15. The electronic device of claim 12, wherein:

the display processor is configured to not transmit the first frame data within the first frame transmission period, and to generate the first DVFS setup/release signal to indicate a DVFS release state, based on a time of receiving the first frame update instruction being a time after a first time, which is earlier by as much as a first frame update allowance period as a reference to the first frame transmission period, the display processor is configured to not transmit the second frame data within the second frame transmission period, and to generate the second DVFS setup/release signal to indicate the DVFS release state, based on a time of receiving the second frame update instruction being a time after a second time, which is earlier by as much as a second frame update allowance period as a reference to the second frame transmission period, and the power management unit is configured to control the power and frequencies of the clock signals according to the first DVFS setup/release signal and the second DVFS setup/release signal.

16. A dynamic voltage and frequency scaling (DVFS) control method by a display processor that is configured to transmit a frame data to a display driving IC (DDI) of driving a display panel, comprising:

receiving a frame update instruction from a host CPU;

determining whether a first time at which the frame update instruction is received is earlier than a second time earlier by as much as a first frame update allowance period with a first frame transmission period as a reference;

generating a DVFS setup/release signal to indicate a DVFS setup state and transmitting the frame data to the DDI within the first frame transmission period based on the first time preceding the second time; and managing a power and clock signals to provide a band width required for the frame data transmission according to the DVFS setup/release signal.

17. The DVFS control method of claim 16, further comprising:

determining not to transmit the frame data within the first frame transmission period and generating the DVFS setup/release signal to indicate a DVFS release state, based on the first time being a time after the second time; and adjusting the power and frequencies of the clock signals according to the DVFS setup/release signal.

18. The DVFS control method of claim 17, further comprising:

determining whether the first time is earlier than a third time, which is earlier by as much as a second frame update allowance period with a second frame transmission period as a reference after the first frame transmission period; and generating the DVFS setup/release signal to indicate the DVFS setup state, and transmitting the frame data to a DDI within the second frame transmission period, based on the first time preceding the third time.

19. The DVFS control method of claim 16, wherein:

receiving a transmission control signal instructing to block the frame data transmission from the DDI; and determining not to transmit the frame data within the first frame transmission period and to generate the DVFS setup/release signal to indicate a DVFS release state, based on the first time preceding the second time during the blocking of the frame data transmission.

20. The DVFS control method of claim 16, wherein:

determining whether the first time is earlier than the second time includes determining whether a time difference between the first time and a starting time of the first frame transmission period is longer than the first frame update allowance period.

* * * * *